US011683773B2

(12) United States Patent
Zhang et al.

(10) Patent No.: US 11,683,773 B2
(45) Date of Patent: Jun. 20, 2023

(54) TIMING ADVANCE UPDATE FOR NON-SERVING CELL

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/114,768

(22) Filed: Dec. 8, 2020

(65) Prior Publication Data

US 2021/0219255 A1    Jul. 15, 2021

Related U.S. Application Data

(60) Provisional application No. 62/959,780, filed on Jan. 10, 2020.

(51) Int. Cl.
| | |
|---|---|
| *H04W 56/00* | (2009.01) |
| *H04W 76/27* | (2018.01) |
| *H04L 5/00* | (2006.01) |
| *H04W 74/08* | (2009.01) |
| *H04L 25/02* | (2006.01) |
| *H04W 80/02* | (2009.01) |
| *H04W 72/23* | (2023.01) |

(52) U.S. Cl.
CPC ....... *H04W 56/0045* (2013.01); *H04L 5/0051* (2013.01); *H04L 25/0226* (2013.01); *H04W 56/001* (2013.01); *H04W 72/23* (2023.01); *H04W 74/0833* (2013.01); *H04W 76/27* (2018.02); *H04W 80/02* (2013.01)

(58) Field of Classification Search
CPC ........... H04W 56/0045; H04W 56/001; H04W 72/042; H04W 74/0833; H04W 76/27; H04W 80/02; H04W 36/00837; H04L 5/0051; H04L 25/0226; H04L 5/0048
See application file for complete search history.

(56) References Cited

U.S. PATENT DOCUMENTS

| | | | |
|---|---|---|---|
| 2015/0271723 A1* | 9/2015 | Yang | H04W 56/0045 455/436 |
| 2018/0077661 A1* | 3/2018 | Zhang | H04W 36/0016 |
| 2019/0200320 A1* | 6/2019 | Selvaganapathy | H04W 64/00 |

FOREIGN PATENT DOCUMENTS

| | | |
|---|---|---|
| EP | 3280199 A1 | 2/2018 |
| EP | 3280199 A1 | 2/2018 |

OTHER PUBLICATIONS

International Search Report and Written Opinion—PCT/US2020/070891—ISA/EPO—dated Mar. 26, 2021.

(Continued)

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment (UE) may receive or determine information indicating a timing advance for a non-serving cell of the UE, and perform an inter-cell mobility operation based at least in part on the timing advance for the non-serving cell of the UE. Numerous other aspects are provided.

30 Claims, 7 Drawing Sheets

(56) References Cited

OTHER PUBLICATIONS

New Postcom: "Considerations on PCell Change without Handover", 3GPP TSG RAN WG2 Meeting #79bis, 3GPP Draft; R2-124777 Considerations on PCell Change Without Handover, 3rd Generation Partnership Project (3GPP), Mobile Competence Centre; 650, Route Des Lucioles; F-06921 Sophiaantipolis Cedex; vol. RAN WG2, No. Bratislava, Slovakia; Oct. 8, 2012-Oct. 12, 2012, Sep. 28, 2012 (Sep. 28, 2012), pp. 1-3, XP050666463, Retrieved from the Internet: URL: https://www.3gpp.org/ftp/tsg_ran/WG2_RL2/TSGR2_79bis/Docs/R2-124777.zip [retrieved on Sep. 28, 2012], The whole document.

Qualcomm Incorporated: "On NR Mobility Enhancements", 3GPP TSG-RAN WG1 Meeting #98, 3GPP Draft; R1-1909284 on NR Mobility Enhancements, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 26, 2019-Aug. 30, 2019, Aug. 17, 2019 (Aug. 17, 2019), 4 Pages, XP051765889, Retrieved from the Internet: URL: https://www.3gpp.org/ftp/tsg_ran/WG1_RL1/TSGR1_98/Docs/R1-1909284.zip [retrieved on Aug. 17, 2019], The whole document.

\* cited by examiner

TIMING ADVANCE UPDATE FOR NON-SERVING CELL

CROSS-REFERENCE TO RELATED APPLICATION

This Patent application claims priority to U.S. Provisional Patent Application No. 62/959,780, filed on Jan. 10, 2020, entitled "TIMING ADVANCE UPDATE FOR NON-SERVING CELL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a timing advance (TA) update for a non-serving cell.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving or determining information indicating a timing advance for a non-serving cell of the UE, and performing an inter-cell mobility operation based at least in part on the timing advance for the non-serving cell of the UE.

In some aspects, a method of wireless communication, performed by a base station, may include determining information indicating a timing advance for a non-serving cell of a UE, and transmitting the information indicating the timing advance to the UE.

In some aspects, a UE for wireless communication may include memory and one or more processors operatively coupled to the memory. The memory and the one or more processors may be configured to receive or determine information indicating a timing advance for a non-serving cell of the UE, and perform an inter-cell mobility operation based at least in part on the timing advance for the non-serving cell of the UE.

In some aspects, a base station for wireless communication may include memory and one or more processors operatively coupled to the memory. The memory and the one or more processors may be configured to determine information indicating a timing advance for a non-serving cell of a UE, and transmit the information indicating the timing advance to the UE.

In some aspects, a non-transitory computer-readable medium may store one or more instructions for wireless communication. The one or more instructions, when executed by one or more processors of a UE, may cause the one or more processors to: receive or determine information indicating a timing advance for a non-serving cell of the UE, and perform an inter-cell mobility operation based at least in part on the timing advance for the non-serving cell of the UE.

In some aspects, a non-transitory computer-readable medium may store one or more instructions for wireless communication. The one or more instructions, when executed by one or more processors of a base station, may cause the one or more processors to: determine information indicating a timing advance for a non-serving cell of a UE, and transmit the information indicating the timing advance to the UE.

In some aspects, an apparatus for wireless communication may include means for receiving or determining information indicating a timing advance for a non-serving cell of the apparatus, and means for performing an inter-cell mobility operation based at least in part on the timing advance for the non-serving cell of the apparatus.

In some aspects, an apparatus for wireless communication may include means for determining information indicating a timing advance for a non-serving cell of a UE, and means for transmitting the information indicating the timing advance to the UE.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
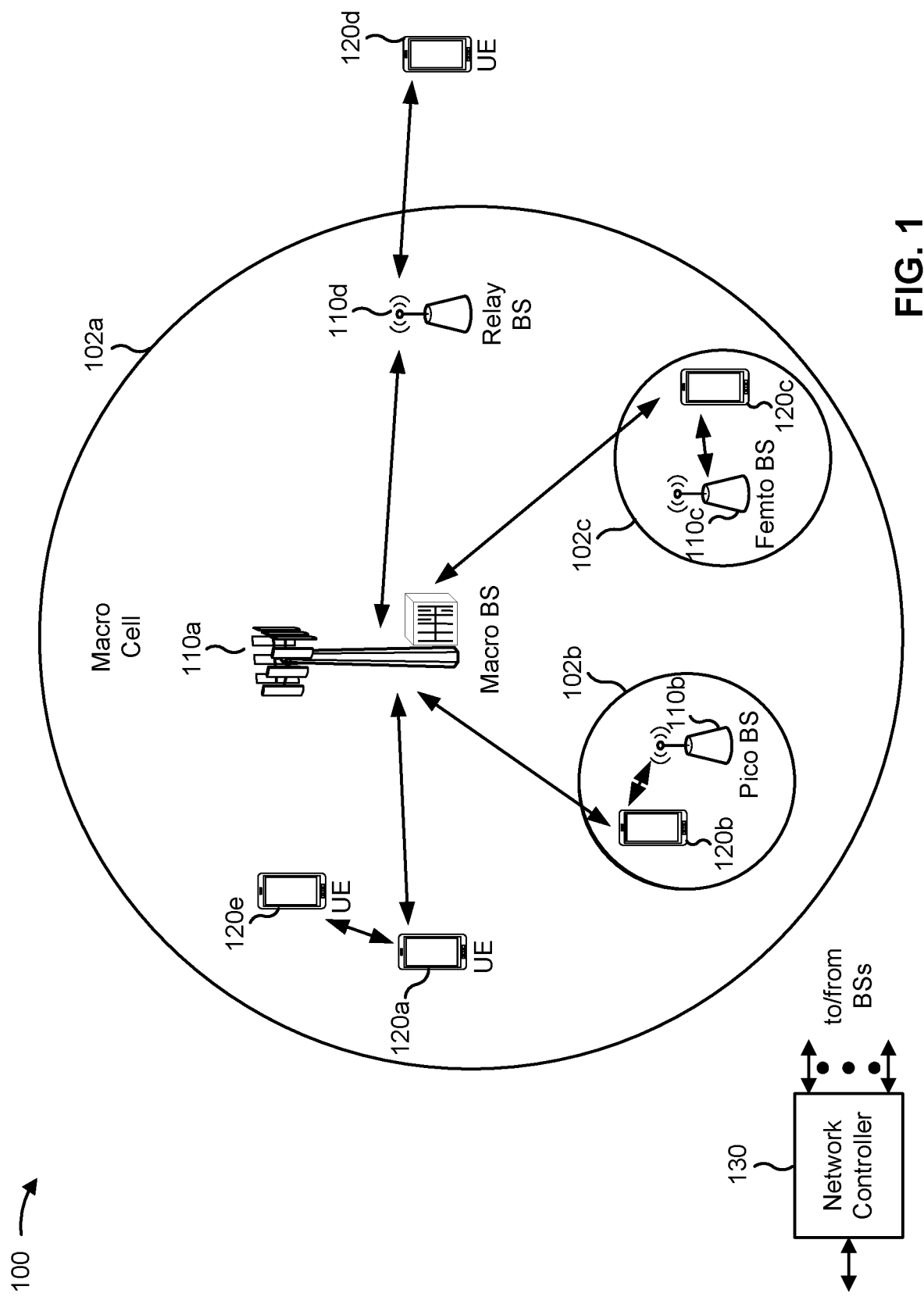
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
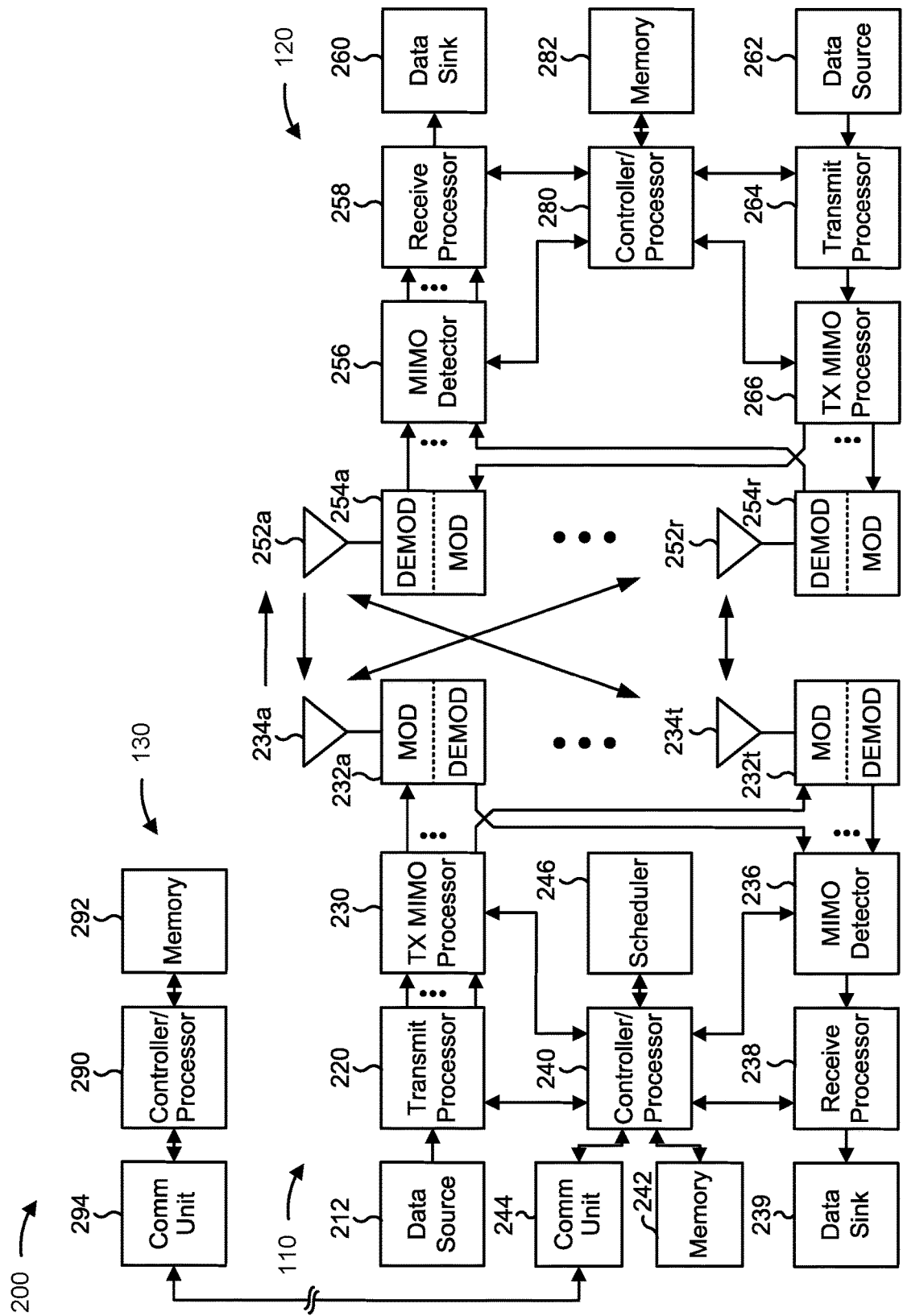
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a timing advance update for a non-serving cell, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving or determining information indicating a timing advance for a non-serving cell of the UE; means for performing an inter-cell mobility operation based at least in part on the timing advance for the non-serving cell of the UE; means for receiving signaling indicating that the non-serving cell belongs to the timing advance group; means for receiving, from the non-serving cell and a serving cell, respective signals, wherein determining the information indicating the timing advance is based at least in part on measuring a reception timing difference between the respective signals; means for transmitting information indicating the reception timing difference to at least one of the serving cell or the non-serving cell; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining information indicating a timing advance for a non-serving cell of a UE; means for transmitting the information indicating the timing advance to the UE; means for transmitting signaling indicating that the non-serving cell belongs to the timing advance group; means for performing a Layer 1 or Layer 2-based inter-cell mobility operation based at least in part on the timing advance for the non-serving cell of the UE; means for transmitting a physical downlink control channel order to the UE to trigger transmission of a RACH preamble, wherein the timing advance is based at least in part on a time difference between the RACH preamble and the physical downlink control channel order; means for scheduling an SRS to be transmitted to the serving cell or the non-serving cell; means for triggering the SRS using downlink control information; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may perform an inter-cell mobility operation to select a candidate cell (also referred to as a selected cell) for communication between the UE and a network. For example, in a dual connectivity operation, the UE may select a set of candidate cells, and may select one or more primary cells (PCells), secondary cells (SCells), primary secondary cells (PSCells), and/or secondary primary cells or special cells (SPCells). The PCell and SCell may be referred to as serving cells. "Non-serving cell" may refer to a neighbor cell or a candidate cell. In some aspects, "SPCell" may refer to a PCell of a master cell group or a PSCell of a secondary cell group, or otherwise to the PCell.

It may be beneficial to reduce latency and higher-layer overhead associated with inter-cell mobility. One way to reduce latency and higher-layer overhead is to perform a Layer 1 or Layer 2-based inter-cell mobility operation, in which mobility operations are handled by the physical layer or medium access control layer of the UE. However, the reduced latency of the Layer 1 or Layer 2 based inter-cell mobility operation may mean that the UE experiences delay in inter-cell mobility based at least in part on not having determined a timing advance for a non-serving cell. For example, the UE may receive information indicating a timing advance only for a serving cell. Therefore, the UE may experience delay in initiating communication with a newly configured serving cell until the UE has received a timing advance command from the newly configured serving cell, which consumes computing resources of the UE and the newly configured serving cell and increases latency.

Some techniques and apparatuses described herein provide determination or signaling of a timing advance (TA) for a non-serving cell (e.g., a candidate cell or a neighbor cell). For example, the TA may be signaled to the UE by a serving cell of the UE, or may be determined by the UE. In some aspects, the serving cell may update a TA of a TA group (TAG), which may update the TA for each cell (e.g., serving cell or non-serving cell) included in the TAG. The TA may be determined based at least in part on a random access channel (RACH) procedure on the non-serving cell, a reference signal (e.g., a sounding reference signal (SRS) and/or the like) transmitted by the UE, or signals transmitted by a serving cell and/or a non-serving cell. In this way, the UE may determine a timing advance for a non-serving cell, which reduces latency associated with inter-cell mobility operations including the non-serving cell and conserves computing resources associated with determining the timing advance once the non-serving cell is configured as a serving cell.

Figure 3:
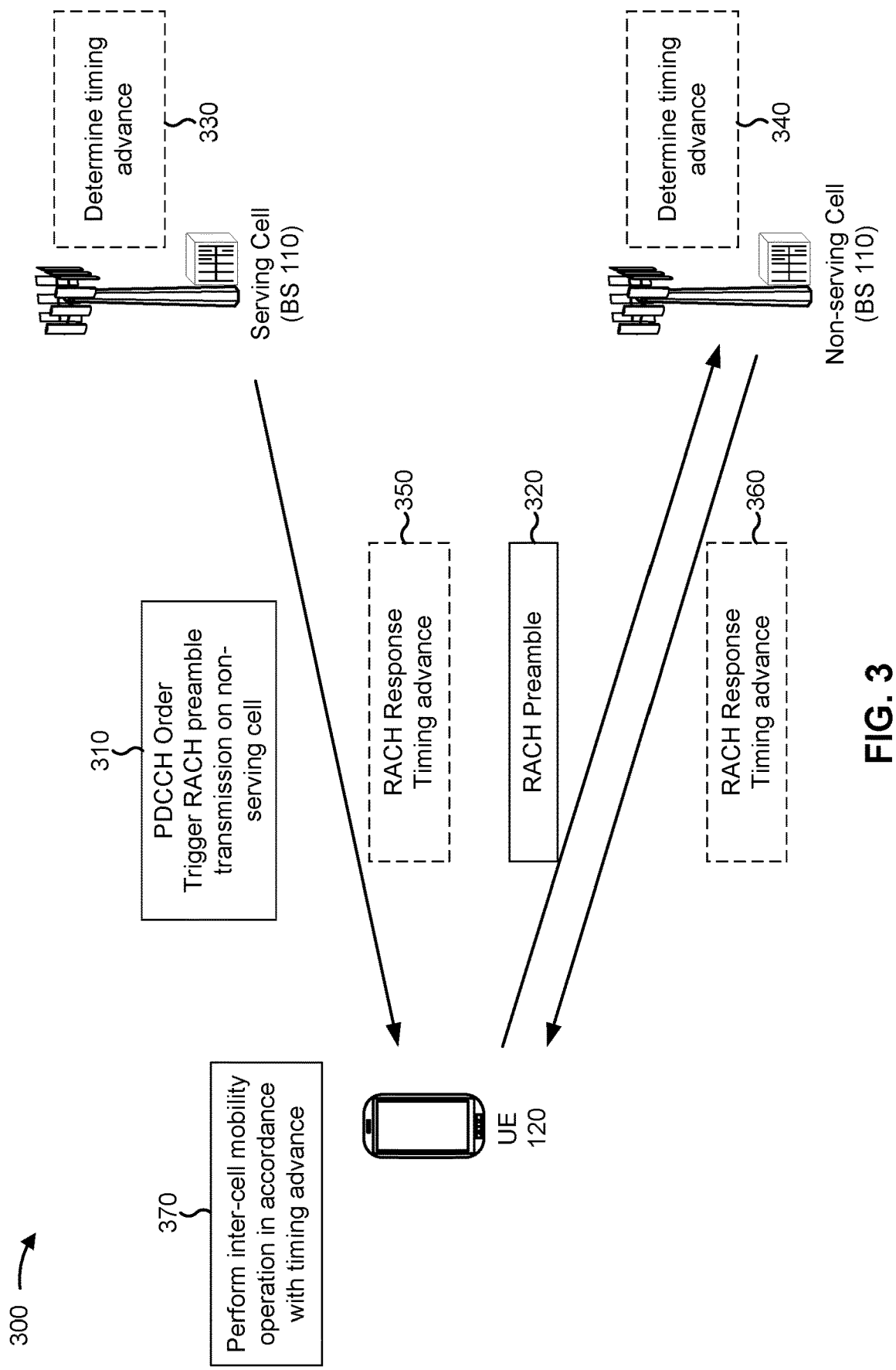
FIG. 3 is a diagram illustrating an example of determining a timing advance for a non-serving cell using a random access channel procedure, in accordance with various aspects of the present disclosure.
Figure 4:
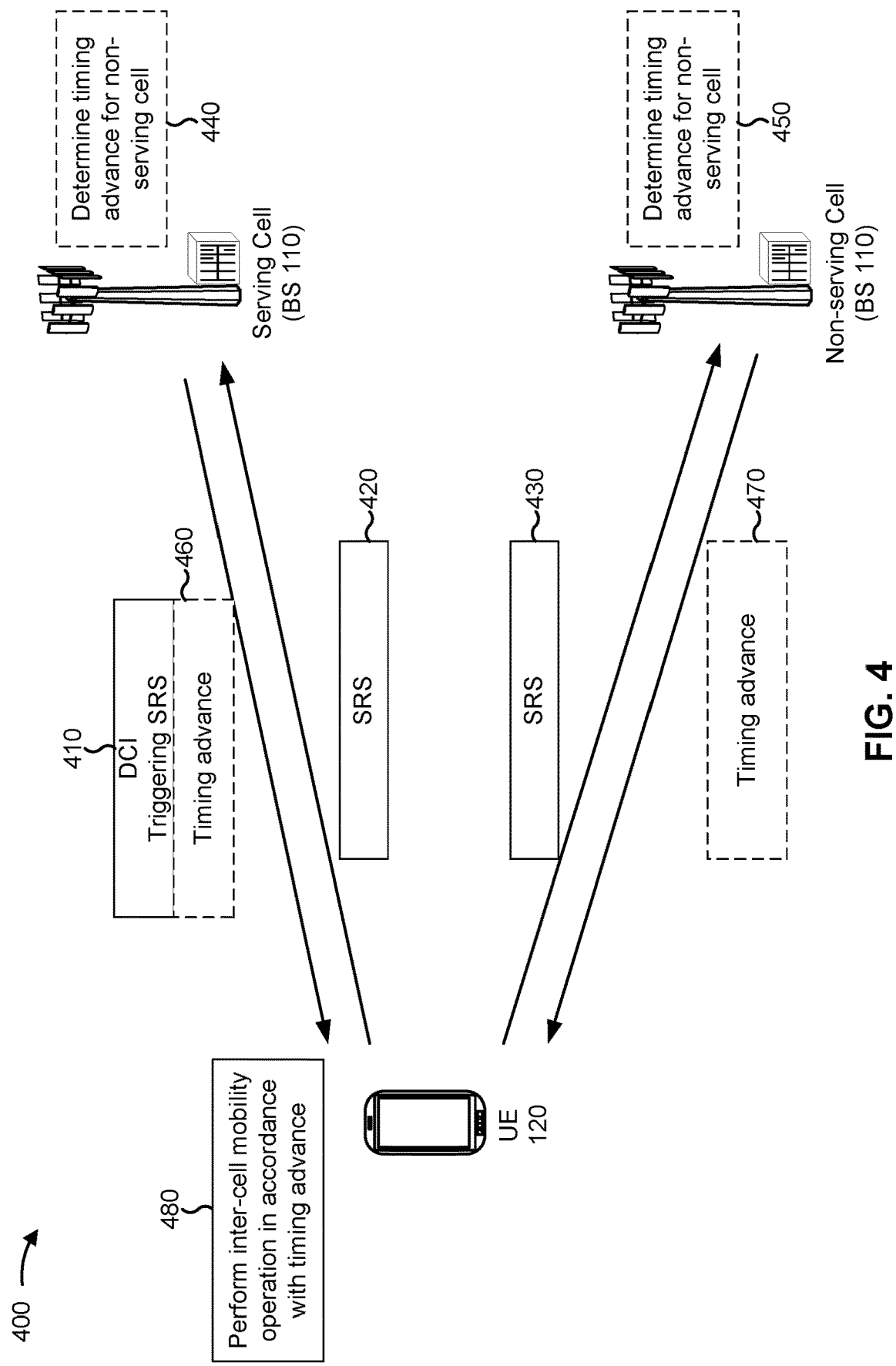
FIG. 4 is a diagram illustrating an example of determining a timing advance for a non-serving cell using a reference signal procedure, in accordance with various aspects of the present disclosure.
Figure 5:
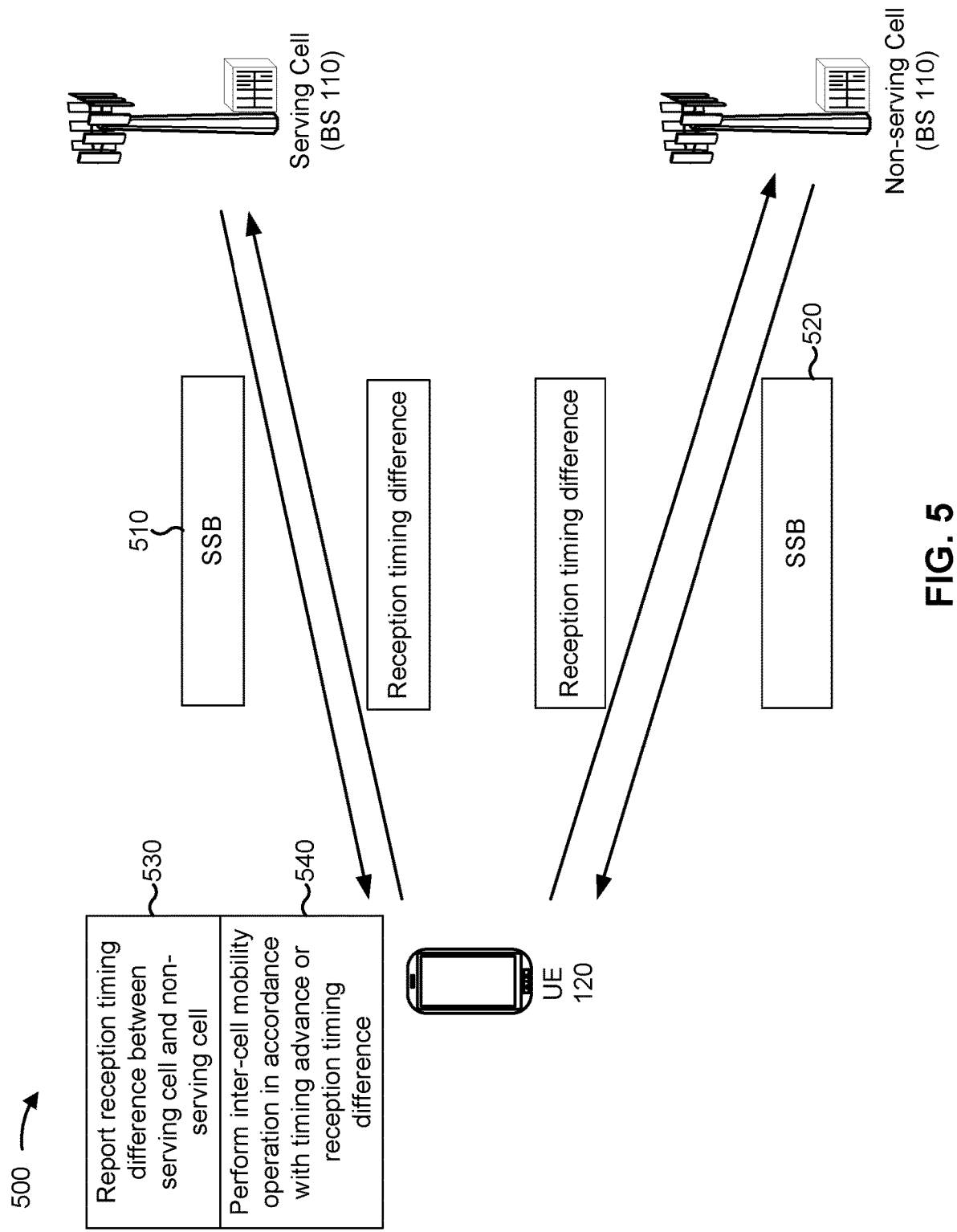
FIG. 5 is a diagram illustrating an example of determining a timing advance for a non-serving cell using a synchronization signal block procedure, in accordance with various aspects of the present disclosure.

FIG. 3 is a diagram illustrating an example 300 of determining a timing advance for a non-serving cell using a RACH procedure, in accordance with various aspects of the present disclosure. As shown, example 300 includes a UE 120, a serving cell (e.g., provided by a BS 110), and a non-serving cell (e.g., provided by a BS 110). The serving cell and the non-serving cell can be provided by the same BS 110 or by different BSs 110. In FIGS. 3-5, boxes with dashed outlines generally indicate actions that can be performed on either of a serving cell or a non-serving cell. As mentioned above, "cell," "base station," and "gNB" may be used interchangeably herein. Therefore, references to transmission or determination by a cell should be understood to also refer to transmissions or determinations by a base station associated with the cell or a gNB associated with the cell.

As shown in FIG. 3, and by reference number 310, the serving cell may transmit a physical downlink control channel (PDCCH) order to the UE 120. The PDCCH order may trigger transmission, by the UE 120, of a RACH preamble on the non-serving cell. For example, the PDCCH order may initiate a physical RACH (PRACH) procedure on the non-serving cell.

As shown by reference number 320, the UE 120 may transmit a RACH preamble on the non-serving cell based at least in part on the PDCCH order. The UE 120 may transmit the RACH preamble so that the BS 110 associated with the serving cell and/or the B S 110 associated with the non-serving cell can determine a timing advance for the UE 120 based at least in part on a transmission time or RACH resource associated with the RACH preamble and a propagation delay associated with the RACH preamble.

As shown by reference number 330 and 340, the serving cell and/or the non-serving cell may determine a timing advance based at least in part on the RACH preamble. For example, the serving cell and/or the non-serving cell may determine the timing advance based at least in part on the transmission time or RACH resource and the propagation delay. As shown by reference numbers 350 and 360, the UE 120 may receive a RACH response on the serving cell (e.g., a PCell, SCell, or SPCell) and/or the non-serving cell. For example, the RACH response may identify the timing advance. In some aspects, the timing advance may be provided to the UE 120 using another form of signaling, such as medium access control (MAC) signaling and/or the like.

In some aspects, the non-serving cell to which the timing advance relates may be identified by a physical cell identifier (PCI) of the non-serving cell. In some aspects, a non-serving cell (e.g., each non-serving cell) may be associated with a corresponding TAG identifier, which may be signaled to the UE 120 using radio resource control (RRC) signaling, a MAC control element (MAC-CE), downlink control information (DCI), and/or the like. A TA control MAC-CE may update the timing advance for all cells of a TAG, which can include the non-serving cell or a corresponding PCI.

As shown by reference number 370, the UE 120 may perform an inter-cell mobility operation (e.g., a Layer 1 or Layer 2-based inter-cell mobility operation) in accordance with the timing advance. For example, the UE 120 may add one or more non-serving cells as serving cells or candidate cells, may store the timing advance of the non-serving cell for future use, and/or the like. In this way, the UE 120 may determine the timing advance of the non-serving cell without connecting to the non-serving cell, which conserves computing resources and reduces delay associated with connecting to the non-serving cell and subsequently determining the timing advance.

As indicated above, FIG. 3 is provided as an example. Other examples may differ from what is described with respect to FIG. 3.

FIG. 4 is a diagram illustrating an example 400 of determining a timing advance for a non-serving cell using a reference signal (RS) procedure, in accordance with various aspects of the present disclosure. As shown, FIG. 4 includes the UE 120, the serving cell, and the non-serving cell, which are described in more detail in connection with FIG. 3.

As shown in FIG. 4, and by reference number 410, the UE 120 may receive DCI from the serving cell. The DCI may trigger the UE 120 to transmit an RS, such as an SRS. For example, the DCI may schedule the UE to transmit the SRS to one or more serving cells and/or one or more non-serving cells. As shown by reference numbers 420 and 430, the UE 120 may transmit the SRS to the serving cell and the non-serving cell.

As shown by reference numbers 440 and 450, the serving cell and/or the non-serving cell may determine a timing advance for the non-serving cell. For example, the serving cell and/or the non-serving cell may determine the timing advance based at least in part on a reception timing difference of the SRS at the serving cell and at the non-serving cell. Accordingly, as shown by reference numbers 460 and 470, the serving cell and/or the non-serving cell may signal the timing advance or the reception timing difference to the UE 120. In some aspects, the serving cell and/or the non-serving cell may signal a timing advance difference to the UE 120, which may indicate a difference between a timing advance of the serving cell and a timing advance of the non-serving cell. As shown by reference number 480, the UE 120 may perform an inter-cell mobility operation in accordance with the timing advance, as described in more detail in connection with FIG. 3. In this way, the UE 120 may determine the timing advance of the non-serving cell without connecting to the non-serving cell, which conserves computing resources and reduces delay associated with connecting to the non-serving cell and subsequently determining the timing advance.

In some aspects, the UE 120 may transmit the SRS to two or more non-serving cells. For example, the UE 120 may transmit the SRS to a non-serving cell with a known timing advance relative to the UE and to a non-serving cell for which the timing advance is to be determined. One or more of these non-serving cells may determine the timing advance, the timing advance difference, or the reception timing difference, and may signal the timing advance, the timing advance difference, or the reception timing difference to the UE 120.

As indicated above, FIG. 4 is provided as an example. Other examples may differ from what is described with respect to FIG. 4.

FIG. 5 is a diagram illustrating an example 500 of determining a timing advance for a non-serving cell using a synchronization signal block (SSB) procedure, in accordance with various aspects of the present disclosure. As shown, FIG. 5 includes the UE 120, the serving cell, and the non-serving cell, which are described in more detail in connection with FIG. 3.

As shown in FIG. 5, and by reference numbers 510 and 520, the UE 120 may receive SSBs from the serving cell and the non-serving cell. For example, the UE 120 may receive respective signals from the serving cell and the non-serving cell. As shown by reference number 530, the UE 120 may determine and report a reception timing difference between the serving cell and the non-serving cell based at least in part on the SSBs. For example, the UE 120 may determine a propagation delay difference between the serving cell and the non-serving cell based at least in part on the respective signals. The UE 120 may determine and/or report the propagation delay difference, or a timing advance or timing advance difference, based at least in part on the propagation delay difference. The propagation delay difference may be similar to a reception timing difference. In some aspects, the UE 120 may receive, from the serving cell and/or the non-serving cell, information indicating the timing advance for the non-serving cell (not shown). For example, the serving cell and/or the non-serving cell may determine the timing advance based at least in part on the reception timing difference, and may provide information indicating the timing advance to the UE 120. As shown by reference number 540, the UE 120 may perform an inter-cell mobility operation in accordance with the timing advance or the reception timing difference, as described in more detail in connection with FIGS. 3 and 4.

As indicated above, FIG. 5 is provided as an example. Other examples may differ from what is described with respect to FIG. 5.

Figure 6:
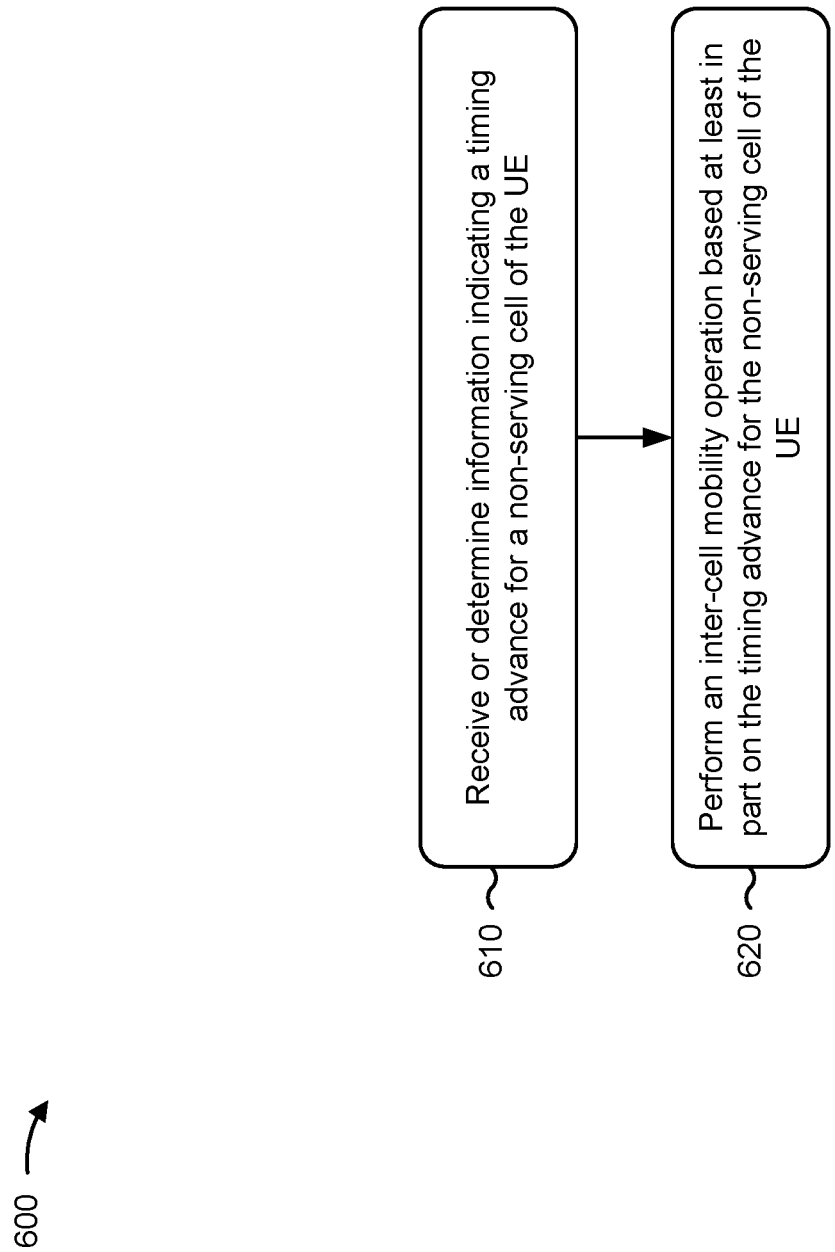
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with determining a timing advance for a non-serving cell.

As shown in FIG. 6, in some aspects, process 600 may include receiving or determining information indicating a timing advance for a non-serving cell of the UE (block 610). For example, the UE (e.g., using antenna 252, DEMOD 254, MIMO detector 256, receive processor 258, controller/processor 280, and/or the like) may receive or determine information indicating a timing advance for a non-serving cell of the UE, as described above.

As further shown in FIG. 6, in some aspects, process 600 may include performing an inter-cell mobility operation based at least in part on the timing advance for the non-serving cell of the UE (block 620). For example, the UE (e.g., using controller/processor 280, transmit processor 264, TX MIMO processor 266, MOD 254, antenna 252, and/or the like) may perform an inter-cell mobility operation based at least in part on the timing advance for the non-serving cell of the UE, as described above.

Process 600 may include additional aspects, such as any single aspect or any combination of aspects described below and/or in connection with one or more other processes described elsewhere herein.

In a first aspect, the inter-cell mobility operation is a Layer 1 or Layer 2-based inter-cell mobility operation.

In a second aspect, alone or in combination with the first aspect, the non-serving cell is a neighbor cell of the UE.

In a third aspect, alone or in combination with one or more of the first and second aspects, the non-serving cell is identified by a physical cell identifier of the non-serving cell.

In a fourth aspect, alone or in combination with one or more of the first through third aspects, the timing advance is associated with a timing advance group to which the non-serving cell belongs.

In a fifth aspect, alone or in combination with one or more of the first through fourth aspects, process 600 includes receiving signaling indicating that the non-serving cell belongs to the timing advance group.

In a sixth aspect, alone or in combination with one or more of the first through fifth aspects, the information indicating the timing advance indicates a physical cell identifier of the non-serving cell or a timing advance group identifier for a timing advance group to which the non-serving cell belongs.

In a seventh aspect, alone or in combination with one or more of the first through sixth aspects, the timing advance group identifier is signaled using at least one of: radio resource control signaling, a medium access control control element, or downlink control information.

In an eighth aspect, alone or in combination with one or more of the first through seventh aspects, the timing advance is for all cells of the timing advance group.

In a ninth aspect, alone or in combination with one or more of the first through eighth aspects, the timing advance is based at least in part on a random access channel (RACH) preamble transmitted to the non-serving cell by the UE.

In a tenth aspect, alone or in combination with one or more of the first through ninth aspects, the RACH preamble is triggered by a physical downlink control channel order received from a serving cell of the UE or from the non-serving cell.

In an eleventh aspect, alone or in combination with one or more of the first through tenth aspects, the information indicating the timing advance is received in a RACH response.

In a twelfth aspect, alone or in combination with one or more of the first through eleventh aspects, the timing advance is based at least in part on a sounding reference signal (SRS) transmitted by the UE to at least one of a serving cell or the non-serving cell.

In a thirteenth aspect, alone or in combination with one or more of the first through twelfth aspects, the SRS is scheduled by the serving cell.

In a fourteenth aspect, alone or in combination with one or more of the first through thirteenth aspects, the SRS is triggered by downlink control information.

In a fifteenth aspect, alone or in combination with one or more of the first through fourteenth aspects, process 600 includes receiving, from the non-serving cell and a serving cell, respective signals, where determining the information indicating the timing advance is based at least in part on measuring a reception timing difference between the respective signals.

In a sixteenth aspect, alone or in combination with one or more of the first through fifteenth aspects, process 600 includes transmitting information indicating the reception timing difference to at least one of the serving cell or the non-serving cell.

In a seventeenth aspect, alone or in combination with one or more of the first through sixteenth aspects, the respective signals comprise synchronization signal blocks.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
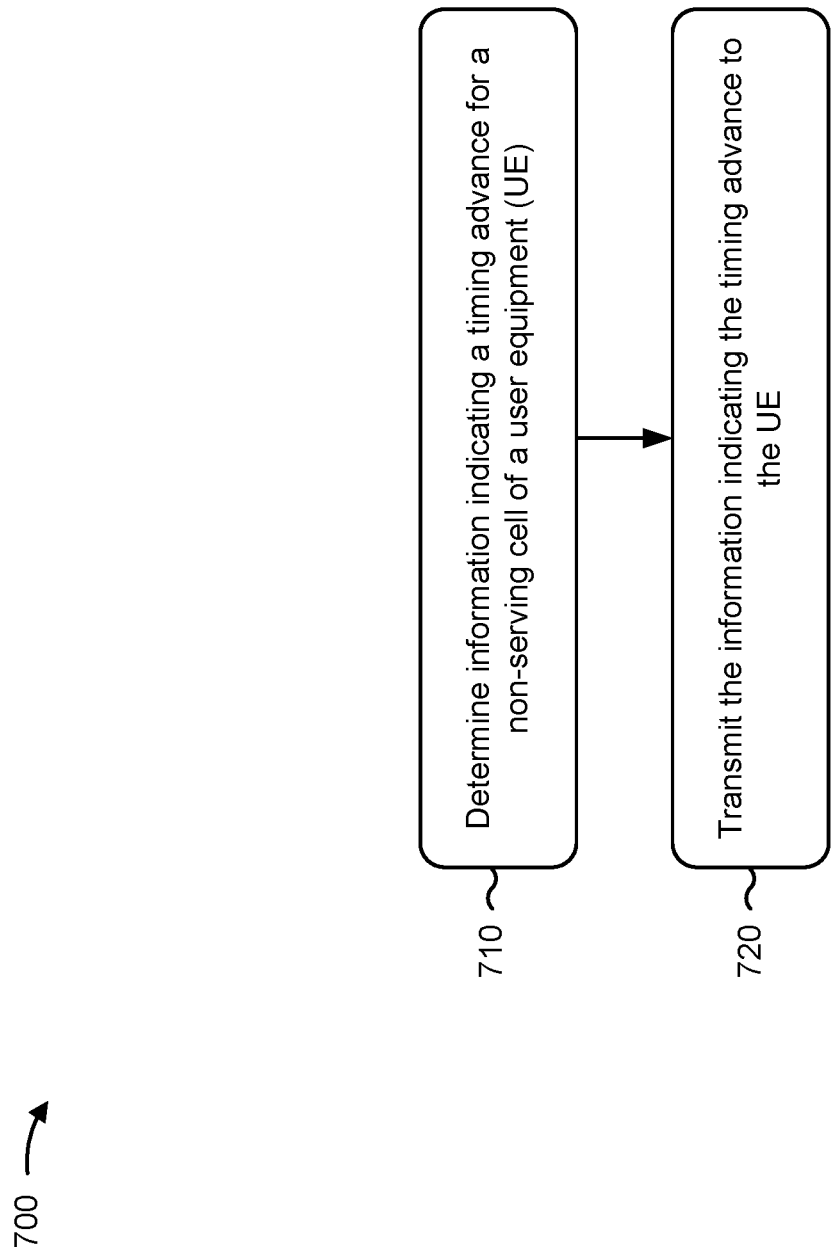
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., BS 110 and/or the like) performs operations associated with determining a timing advance for a non-serving cell.

As shown in FIG. 7, in some aspects, process 700 may include determining information indicating a timing advance for a non-serving cell of a user equipment (UE) (block 710). For example, the base station (e.g., using antenna 234, DEMOD 232, MIMO detector 236, receive processor 238, controller/processor 240, and/or the like) may determine information indicating a timing advance for a non-serving cell of a UE, as described above.

As further shown in FIG. 7, in some aspects, process 700 may include transmitting the information indicating the timing advance to the UE (block 720). For example, the base station (e.g., using controller/processor 240, transmit processor 220, TX MIMO processor 230, MOD 232, antenna 234, and/or the like) may transmit the information indicating the timing advance to the UE, as described above.

Process 700 may include additional aspects, such as any single aspect or any combination of aspects described below and/or in connection with one or more other processes described elsewhere herein.

In a first aspect, process 700 includes performing a Layer 1 or Layer 2-based inter-cell mobility operation based at least in part on the timing advance for the non-serving cell of the UE.

In a second aspect, alone or in combination with the first aspect, the non-serving cell is a neighbor cell of the UE.

In a third aspect, alone or in combination with one or more of the first and second aspects, the non-serving cell is identified by a physical cell identifier of the non-serving cell.

In a fourth aspect, alone or in combination with one or more of the first through third aspects, the timing advance is associated with a timing advance group to which the non-serving cell belongs.

In a fifth aspect, alone or in combination with one or more of the first through fourth aspects, process 700 includes transmitting signaling indicating that the non-serving cell belongs to the timing advance group.

In a sixth aspect, alone or in combination with one or more of the first through fifth aspects, the information indicating the timing advance indicates a physical cell identifier of the non-serving cell or a timing advance group identifier for a timing advance group to which the non-serving cell belongs.

In a seventh aspect, alone or in combination with one or more of the first through sixth aspects, the timing advance group identifier is signaled using at least one of: radio resource control signaling, a medium access control control element, or downlink control information.

In an eighth aspect, alone or in combination with one or more of the first through seventh aspects, the timing advance is for all cells of the timing advance group.

In a ninth aspect, alone or in combination with one or more of the first through eighth aspects, the timing advance is based at least in part on a RACH preamble transmitted to the non-serving cell by the UE.

In a tenth aspect, alone or in combination with one or more of the first through ninth aspects, process 700 includes transmitting a physical downlink control channel order to the UE to trigger transmission of the RACH preamble, wherein the timing advance is based at least in part on a time difference between the RACH preamble and the physical downlink control channel order.

In an eleventh aspect, alone or in combination with one or more of the first through tenth aspects, the information indicating the timing advance is transmitted in a RACH response.

In a twelfth aspect, alone or in combination with one or more of the first through eleventh aspects, the timing advance is based at least in part on receiving a sounding reference signal (SRS) from the UE.

In a thirteenth aspect, alone or in combination with one or more of the first through twelfth aspects, process 700 includes scheduling the SRS to be transmitted to the serving cell or the non-serving cell.

In a fourteenth aspect, alone or in combination with one or more of the first through thirteenth aspects, process 700 includes triggering the SRS using downlink control information.

In a fifteenth aspect, alone or in combination with one or more of the first through fourteenth aspects, determining the information indicating the timing advance is based at least in part on information received from the UE.

In a sixteenth aspect, alone or in combination with one or more of the first through fifteenth aspects, the information received from the UE is based at least in part on a reception timing difference between a signal transmitted by the base station on a serving cell and a signal transmitted by the non-serving cell.

In a seventeenth aspect, alone or in combination with one or more of the first through sixteenth aspects, the respective signals comprise synchronization signal blocks.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of aspects of the present disclosure:

Aspect 1: A method of wireless communication performed by a user equipment (UE), comprising: receiving or determining information indicating a timing advance for a non-serving cell of the UE; and performing an inter-cell mobility operation based at least in part on the timing advance for the non-serving cell of the UE.

Aspect 2: The method of aspect 1, wherein the inter-cell mobility operation is a Layer 1 or Layer 2-based inter-cell mobility operation.

Aspect 3: The method of any of aspects 1-2, wherein the non-serving cell is a neighbor cell of the UE.

Aspect 4: The method of any of aspects 1-3, wherein the non-serving cell is identified by a physical cell identifier of the non-serving cell.

Aspect 5: The method of any of aspects 1-4, wherein the timing advance is associated with a timing advance group to which the non-serving cell belongs.

Aspect 6: The method of aspect 5, further comprising: receiving signaling indicating that the non-serving cell belongs to the timing advance group.

Aspect 7: The method of any of aspects 1-6, wherein the information indicating the timing advance indicates a physical cell identifier of the non-serving cell or a timing advance group identifier for a timing advance group to which the non-serving cell belongs.

Aspect 8: The method of aspect 7, wherein the timing advance group identifier is signaled using at least one of: radio resource control signaling, a medium access control control element, or downlink control information.

Aspect 9: The method of aspect 7, wherein the timing advance is for all cells of the timing advance group.

Aspect 10: The method of any of aspects 1-9, wherein the timing advance is based at least in part on a random access channel (RACH) preamble transmitted to the non-serving cell by the UE.

Aspect 11: The method of aspect 10, wherein the RACH preamble is triggered by a physical downlink control channel order received from a serving cell of the UE or from the non-serving cell.

Aspect 12: The method of aspect 10, wherein the information indicating the timing advance is received in a RACH response.

Aspect 13: The method of any of aspects 1-12, wherein the timing advance is based at least in part on a sounding reference signal (SRS) transmitted by the UE to at least one of a serving cell or the non-serving cell.

Aspect 14: The method of aspect 13, wherein the SRS is scheduled by the serving cell.

Aspect 15: The method of aspect 13, wherein the SRS is triggered by downlink control information.

Aspect 16: The method of any of aspects 1-15, further comprising: receiving, from the non-serving cell and a serving cell, respective signals, wherein determining the information indicating the timing advance is based at least in part on measuring a reception timing difference between the respective signals.

Aspect 17: The method of aspect 16, further comprising: transmitting information indicating the reception timing difference to at least one of the serving cell or the non-serving cell.

Aspect 18: The method of aspect 16, wherein the respective signals comprise synchronization signal blocks.

Aspect 19: A method of wireless communication performed by a base station, comprising: determining information indicating a timing advance for a non-serving cell of a user equipment (UE); and transmitting the information indicating the timing advance to the UE.

Aspect 20: The method of aspect 19, further comprising: performing a Layer 1 or Layer 2-based inter-cell mobility operation based at least in part on the timing advance for the non-serving cell of the UE.

Aspect 21: The method of any of aspects 19-20, wherein the non-serving cell is a neighbor cell of the UE.

Aspect 22: The method of any of aspects 19-21, wherein the non-serving cell is identified by a physical cell identifier of the non-serving cell.

Aspect 23: The method of any of aspects 19-22, wherein the timing advance is associated with a timing advance group to which the non-serving cell belongs.

Aspect 24: The method of aspect 23, further comprising: transmitting signaling indicating that the non-serving cell belongs to the timing advance group.

Aspect 25: The method of any of aspects 19-24, wherein the information indicating the timing advance indicates a physical cell identifier of the non-serving cell or a timing advance group identifier for a timing advance group to which the non-serving cell belongs.

Aspect 26: The method of aspect 25, wherein the timing advance group identifier is signaled using at least one of: radio resource control signaling, a medium access control control element, or downlink control information.

Aspect 27: The method of aspect 25, wherein the timing advance is for all cells of the timing advance group.

Aspect 28: The method of any of aspects 19-27, wherein the timing advance is based at least in part on a random access channel (RACH) preamble transmitted to the non-serving cell by the UE.

Aspect 29: The method of aspect 28, further comprising: transmitting a physical downlink control channel order to the UE to trigger transmission of the RACH preamble, wherein the timing advance is based at least in part on measuring a time difference between the RACH preamble and the physical downlink control channel order.

Aspect 30: The method of aspect 28, wherein the information indicating the timing advance is transmitted in a RACH response.

Aspect 31: The method of any of aspects 19-30, wherein the timing advance is based at least in part on receiving a sounding reference signal (SRS) from the UE.

Aspect 32: The method of aspect 31, further comprising: scheduling the SRS to be transmitted to the serving cell or the non-serving cell.

Aspect 33: The method of aspect 32, further comprising: triggering the SRS using downlink control information.

Aspect 34: The method of any of aspects 19-33, wherein determining the information indicating the timing advance is based at least in part on information received from the UE.

Aspect 35: The method of aspect 34, wherein the information received from the UE is based at least in part on a reception timing difference between a signal transmitted by the base station on a serving cell and a signal transmitted by the non-serving cell.

Aspect 36: The method of aspect 35, wherein the signal transmitted on the serving cell and the signal transmitted by the non-serving cell comprise synchronization signal blocks.

Aspect 37: An apparatus for wireless communication at a device, comprising a processor; memory coupled with the processor; and instructions stored in the memory and executable by the processor to cause the apparatus to perform the method of one or more aspects of aspects 1-36.

Aspect 38: A device for wireless communication, comprising a memory and one or more processors coupled to the memory, the memory and the one or more processors configured to perform the method of one or more aspects of aspects 1-36.

Aspect 39: An apparatus for wireless communication, comprising at least one means for performing the method of one or more aspects of aspects 1-36.

Aspect 40: A non-transitory computer-readable medium storing code for wireless communication, the code comprising instructions executable by a processor to perform the method of one or more aspects of aspects 1-36.

Aspect 41: A non-transitory computer-readable medium storing a set of instructions for wireless communication, the set of instructions comprising one or more instructions that, when executed by one or more processors of a device, cause the device to perform the method of one or more aspects of aspects 1-36.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
    a memory; and
    one or more processors coupled to the memory the one or more processors configured to cause the UE to:
        receive or determine, based at least in part on a timing advance group identifier of a non-serving cell, information indicating a timing advance for the non-serving cell of the UE; and
        perform an inter-cell mobility operation based at least in part on the timing advance for the non-serving cell of the UE.

2. The UE of claim 1, wherein the inter-cell mobility operation is a Layer 1 or Layer 2-based inter-cell mobility operation.

3. The UE of claim 1, wherein the non-serving cell is a neighbor cell of the UE.

4. The UE of claim 1, wherein the non-serving cell is identified by a physical cell identifier of the non-serving cell.

5. The UE of claim 1, wherein the timing advance is associated with a timing advance group to which the non-serving cell belongs.

6. The UE of claim 5, wherein the one or more processors are further configured to cause the UE to:
    receive signaling indicating that the non-serving cell belongs to the timing advance group.

7. The UE of claim 1, wherein the information indicating the timing advance indicates a physical cell identifier of the non-serving cell or the timing advance group identifier for a timing advance group to which the non-serving cell belongs.

8. The UE of claim 7, wherein the timing advance group identifier is signaled using at least one of: radio resource control signaling, a medium access control control element, or downlink control information.

9. The UE of claim 7, wherein the timing advance is for all cells of the timing advance group.

10. The UE of claim 1, wherein the timing advance is based at least in part on a random access channel (RACH) preamble transmitted to the non-serving cell by the UE.

11. The UE of claim 10, wherein the RACH preamble is triggered by a physical downlink control channel order received from a serving cell of the UE or from the non-serving cell.

12. The UE of claim 10, wherein the information indicating the timing advance is received in a RACH response.

13. The UE of claim 1, wherein the timing advance is based at least in part on a sounding reference signal (SRS) transmitted by the UE to at least one of a serving cell or the non-serving cell.

14. The UE of claim 13, wherein the SRS is scheduled by the serving cell.

15. The UE of claim 13, wherein the SRS is triggered by downlink control information.

16. The UE of claim 1, wherein the one or more processors are further configured to cause the UE to:
receive, from the non-serving cell and a serving cell, respective signals, wherein determining the information indicating the timing advance is based at least in part on measuring a reception timing difference between the respective signals.

17. The UE of claim 16, wherein the one or more processors are further configured to cause the UE to:
transmit information indicating the reception timing difference to at least one of the serving cell or the non-serving cell.

18. The UE of claim 16, wherein the respective signals comprise synchronization signal blocks.

19. A base station for wireless communication, comprising:
a memory; and
one or more processors coupled to the memory, the one or more processors configured to:
determine, based at least in part on a timing advance group identifier of a non-serving cell, information indicating a timing advance for the non-serving cell of a user equipment (UE); and
transmit the information indicating the timing advance to the UE.

20. The base station of claim 19, wherein the one or more processors are further configured to cause the UE to:
perform a Layer 1 or Layer 2-based inter-cell mobility operation based at least in part on the timing advance for the non-serving cell of the UE.

21. The base station of claim 19, wherein the non-serving cell is a neighbor cell of the UE.

22. The base station of claim 19, wherein the non-serving cell is identified by a physical cell identifier of the non-serving cell.

23. The base station of claim 19, wherein the timing advance is associated with a timing advance group to which the non-serving cell belongs.

24. The base station of claim 23, wherein the one or more processors are further configured to cause the UE to:
transmit signaling indicating that the non-serving cell belongs to the timing advance group.

25. The base station of claim 19, wherein the information indicating the timing advance indicates a physical cell identifier of the non-serving cell or the timing advance group identifier for a timing advance group to which the non-serving cell belongs.

26. The base station of claim 19, wherein the timing advance is based at least in part on a random access channel (RACH) preamble transmitted to the non-serving cell by the UE.

27. The base station of claim 19, wherein the timing advance is based at least in part on receiving a sounding reference signal (SRS) from the UE.

28. The base station of claim 27, wherein the one or more processors are further configured to cause the UE to:
schedule the SRS to be transmitted to the serving cell or the non-serving cell.

29. A method of wireless communication performed by a user equipment (UE), comprising:
receiving or determining, based at least in part on a timing advance group identifier of a non-serving cell, information indicating a timing advance for the non-serving cell of the UE; and
performing an inter-cell mobility operation based at least in part on the timing advance for the non-serving cell of the UE.

30. A method of wireless communication performed by a base station, comprising:
determining, based at least in part on a timing advance group identifier of a non-serving cell, information indicating a timing advance for the non-serving cell of a user equipment (UE); and
transmitting the information indicating the timing advance to the UE.

* * * * *